United States Patent [19]

Alferness et al.

[11] Patent Number: 5,363,490
[45] Date of Patent: Nov. 8, 1994

[54] APPARATUS FOR AND METHOD OF CONDITIONALLY ABORTING AN INSTRUCTION WITHIN A PIPELINED ARCHITECTURE

[75] Inventors: Merwin H. Alferness, New Brighton, Minn.; Eric Collins, Naperville, Ill.

[73] Assignee: Unisys Corporation, Blue Bell, Pa.

[21] Appl. No.: 829,697

[22] Filed: Feb. 3, 1992

[51] Int. Cl.⁵ .............................................. G06F 9/38
[52] U.S. Cl. .................................... 395/375; 395/800; 364/231.8; 364/261.3; 364/263; 364/DIG. 1
[58] Field of Search ................. 395/375, 425, 800, 775

[56] References Cited

U.S. PATENT DOCUMENTS

| | | | |
|---|---|---|---|
| 4,155,120 | 5/1979 | Keefer et al. | 395/375 |
| 4,757,445 | 7/1988 | Zolnowsky et al. | 395/375 |
| 4,835,679 | 5/1989 | Kida et al. | |
| 4,855,904 | 8/1989 | Daberkow et al. | |
| 4,872,109 | 10/1989 | Horst et al. | |
| 4,875,160 | 10/1989 | Brown, III | |
| 4,890,225 | 12/1989 | Ellis, Jr. et al. | |
| 4,891,754 | 1/1990 | Boreland | |
| 4,924,376 | 5/1990 | Ooi | |
| 4,942,525 | 7/1990 | Shintani et al. | 395/375 |
| 4,980,823 | 12/1990 | Liu | |
| 5,014,196 | 5/1991 | Hayashi et al. | |
| 5,040,107 | 8/1991 | Duxbury et al. | |
| 5,155,817 | 10/1992 | Kishigami et al. | 395/375 |
| 5,202,967 | 4/1993 | Matsuzaki et al. | 345/375 |

*Primary Examiner*—Alyssa H. Bowler
*Assistant Examiner*—Alpesh M. Shah
*Attorney, Agent, or Firm*—Nawrocki, Rooney & Silvertson

[57] ABSTRACT

An apparatus for and method of aborting the remainder of a microinstruction if a branch by that microinstruction or a subsequent microinstruction renders the results of said microinstruction to be invalid. Within an instruction processor having the capability for pipelined operation, the sensitivity of an operation of a microinstruction to the branch condition may be indicated by one or more abort bits. If an abort bit is set and the corresponding branch condition occurs, the remainder of the microinstruction is aborted. By thus indicating the sensitivity to a branch, the microinstruction can proceed under full pipeline operation until such time as a branch condition actually occurs.

7 Claims, 10 Drawing Sheets

APPARATUS FOR AND METHOD OF CONDITIONALLY ABORTING AN INSTRUCTION WITHIN A PIPELINED ARCHITECTURE

CROSS REFERENCE TO CO-PENDING APPLICATIONS

The present application is related to U.S. patent application Ser. No. 07/762,282, filed Sep. 19, 1991, entitled "Cooperative Hardware and Microcode Control System for Pipelined Instruction Execution", and U.S. patent application Ser. No. 07/762,276, filed Sep. 19, 1992 now abandoned, entitled "Data Coherency Protocol for Multi-level Cached High Performance Multiprocessor System", both assigned to the assignee of the present invention and both incorporated herein by reference.

BACKGROUND OF THE INVENTION

1. Field of the Invention

The present invention generally relates to general purpose digital data processing systems and more particularly relates to such systems which employ pipelined execution of program instructions.

2. Description of the Prior Art

In most general purpose, stored program, digital computers, software is developed under the assumption that program instructions are executed in their entirety in a sequential fashion. This frees the software developer from the need to account for potential non-sequential operation of the hardware. However, most large scale modern machines are designed to take advantage of the overlapping of various functions. In its simplest form, such overlapping permits instruction processing of the N+1st instruction to be performed during operand processing of the Nth instruction. U.S. Pat. No. 4,890,225 issued to Ellis, Jr. et al. shows a rudimentary overlapped machine. To free the software developer from concerns about non-sequentiality, Ellis Jr. et al. store the machine state during the complete execution of the Nth instruction. U.S. Pat. No. 4,924,376 issued to Ooi provides a technique for resource allocation in an overlapped environment.

A more general form of overlapping is termed a pipelined environment. In implementing such a machine, the designer dedicates certain hardware resources to the various repetitive tasks. The performance advantage in this dedication comes from employing these dedicated hardware elements simultaneously. Typically, this means that instruction decode, operand fetch, and arithmetic operations each have separate and dedicated hardware resources. Even though the Nth instruction is processed by each of these hardware resources sequentially, each separate hardware resource is deployed on a different instruction simultaneously. The N+1st instruction may be processed by the instruction fetch and decode hardware, while the Nth instruction is being processed by the operand fetch hardware and while the N−1st instruction is being processed by the arithmetic hardware. U.S. Pat. No. 4,855,904 issued to Daberkow, et al. describes a pipelined architecture.

The problems associated with sequentiality experienced by software developers are magnified when considering microcode controlled machines operating in a pipelined mode. The performance advantages of the pipelined architecture can be readily dissipated by timing problems within the machine. U.S. Pat. No. 4,875,160 issued to Brown III discusses a number of pipeline based problems including conditional branching of microcode. The Brown III system accommodates pipeline exceptions by extending performance time for one or more clock cycles. U.S. Pat. No. 4,980,823 issued to Liu seeks to minimize the impact of branching on performance by prefetching of predicted data.

Other approaches to the problem include "de-pipping". That is simply forcing serial performance of all functions until the pipeline exception is accommodated. U.S. Pat. No. 5,014,196 issued to Hayashi et al. suggests this approach for certain types of pipeline problems.

Another way to provide protection for microcode branching is by using non-staged control. In this approach, each microcode instruction becomes a family of instructions which provide for the various permutations and combinations associated with the branch conditions. Each member of this instruction family controls all stages for a single clock cycle rather than only one stage per cycle for a number of clock cycles. U.S. Pat. No. 4,891,754 issued to Boreland suggests such an approach. Non-staged design tends to cause additional complexity in microcode design. Boreland approaches this problem by providing additional read only memory to store the combinations. U.S. Pat. No. 4,835,679 issued to Kida et al. and U.S. Pat. No. 4,872,109 issued to Horst et al. show that read only memory space can be saved by slowing the pipeline during conditional branching.

U.S. Pat. No. 5,040,107 issued to Duxbury et al. operates the pipeline until a dependency is found using a look-ahead technique. The dependency is resolved by aborting the second (i.e. dependent) instruction to preserve sequentiality resulting in a performance penalty.

SUMMARY OF THE INVENTION

The present invention overcomes many of the disadvantages of the prior art by providing a machine with staged microcode control which permits one or more functions to be conditionally aborted without depiping or otherwise delaying pipelined operation. In the preferred mode, the instruction processor architecture has dedicated hardware for instruction decode, operand fetch, and arithmetic operations. While in the pipeline mode, each of these three functions is performed simultaneously resulting in a three position pipeline. For the simplest of instructions, a single clock cycle is used for each position. Therefore, one such instruction requires three clock cycles to complete. Yet because of the pipelining, an instruction completes the arithmetic function (i.e. completes execution) each clock cycle providing an effective execution rate of one instruction per clock cycle.

For an extended length instruction which requires more than three clock cycles to complete, the preferred mode employs a series of microcode instructions which divide the extended length instruction into logical functions. This series of microcode instructions is executed in pipeline fashion as if each were one of the simpler three clock cycle instructions. In this manner, the performance advantages of pipelining are preserved, notwithstanding a mix of simple and extended length instructions.

In either case, individual instructions are staged such that a single instruction sequentially controls one of the three positions within the pipeline during three successive clock cycles. During the first pipeline stage (i.e. instruction decode), those portions of the instruction are used which control the first pipeline stage functions. The remaining information within the instruction is saved or staged until subsequent clock cycles in which the other functions are performed. The operand fetch information is used during the second or operand fetch stage. Similarly, the remaining information is used to control the arithmetic or third stage.

For simple, three clock cycle instructions, sequentiality of the instructions is assumed by the software developer, thereby assuring that conditional branching within the N+1st instruction in the sequence will not impact execution of the Nth instruction. However, the problem of microcode control of the extended length instructions is substantially different. To take maximum performance advantage of the pipeline and yet obtain the ease of microcode development provided by staging, it is often desirable to condition performance of a task of the Nth instruction by branching of the Nth or the N+1st (or subsequent) instruction. The present invention solves this problem by providing the capability to conditionally abort a function without depiping.

In the preferred embodiment of the present invention, a critical function involves storage of data within the General Register Stack (i.e. GRS). Ordinarily, this is one of the last functions to be performed by an instruction. It is particularly critical because the GRS is used to maintain the intermediate and final products of the various arithmetic and logical operations being performed.

Quite often during microcode control of extended length instructions, execution of this GRS storage function for the Nth instruction is conditioned upon a branch which may be made by a subsequent instruction. A typical example is an operand limit check which may be performed by the N+1st microcode instruction, during the determination of some intermediate arithmetic product by the Nth microcode instruction. Storage of that intermediate arithmetic product into the GRS may be aborted after the arithmetic computation as a result of a branch by the limit check instruction. Though the pipeline stage associated with the arithmetic function is thus wasted for one clock cycle, the system need not be depiped to determine the result of the limit check before initiation of the arithmetic computation.

Though the preferred mode is particularly concerned with conditionally aborting a GRS store, other types of conditionally aborts are clearly contemplated.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
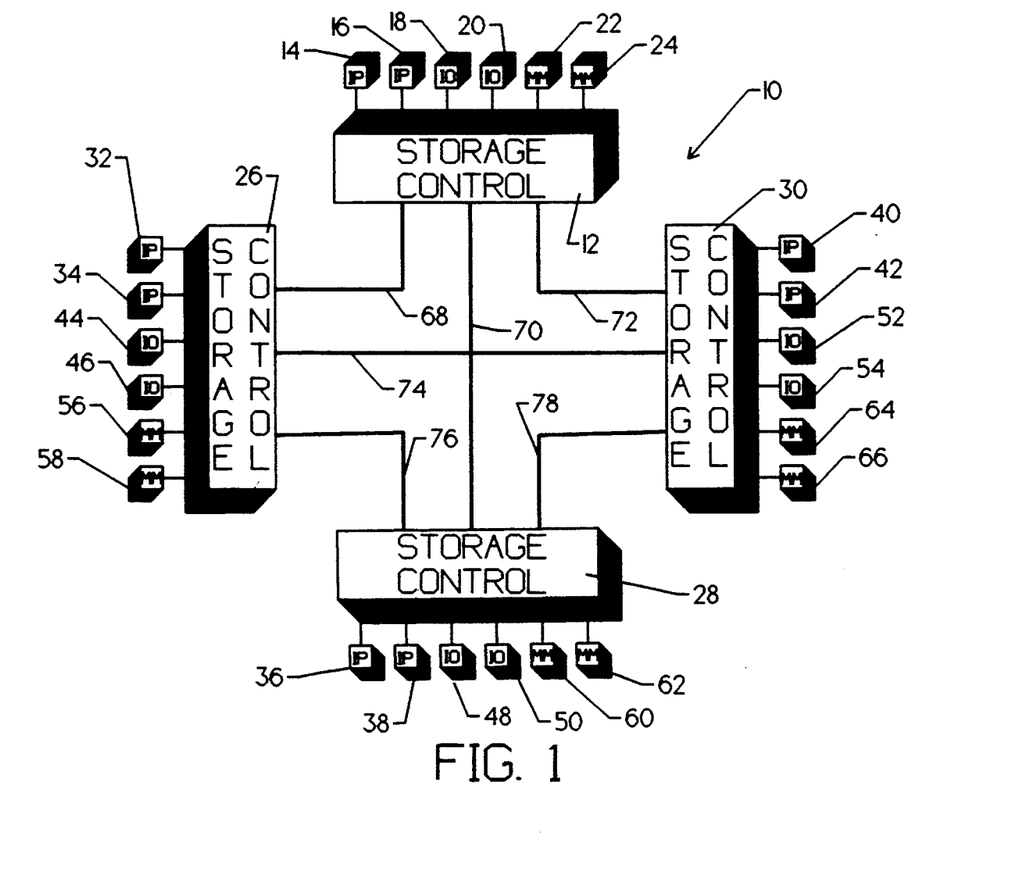
FIG. 1 is a schematic diagram of a fully populated data processing system incorporating the present invention.

FIG. 1 is an overall diagram of fully populated data processing system 10 according to the present invention. Data processing system 10 includes four individual processing clusters, each having its own storage controller and each having point-to-point communication with the other clusters via a storage controller to storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above referenced and commonly assigned co-pending U.S. patent application which has been incorporated by reference.

Input/output processors 18 and 20, along with main memory modules 22 and 24, may be elements currently available, such as found in the Unisys Model 2200/600 series. Input/output processors 44, 46, 48, 50, 52, and 54 and main memory modules 56, 58, 60, 62, 64, and 66 may be similarly found.

Figure 2:
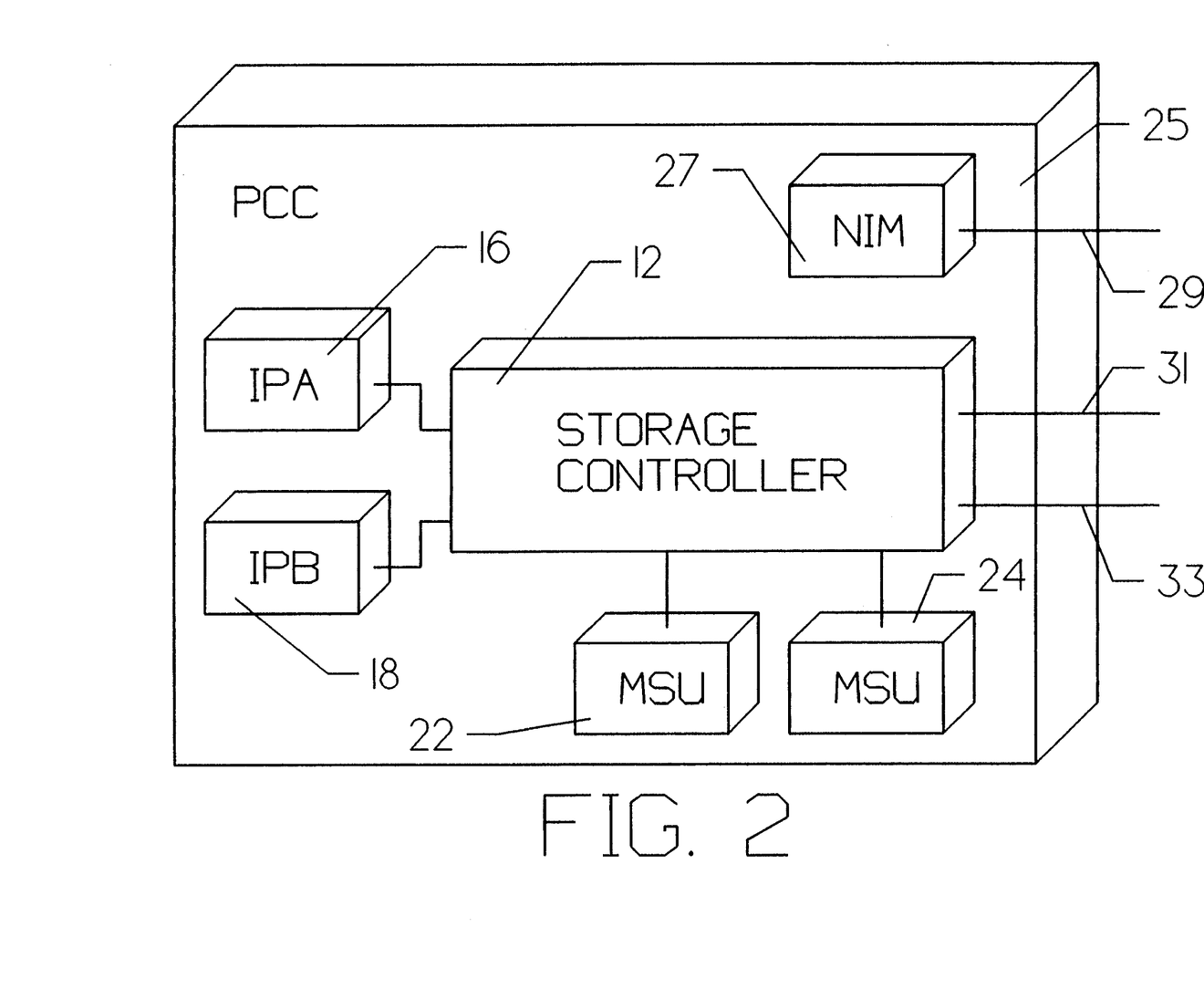
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Cabinet, PCC 25. Within fully populated PCC 25 is located instruction processors 16 and 18 (i.e. IPA and IPB). In the preferred mode, each of these instruction processors is packaged on a single high density circuit board. The memory storage units 22 and 24 are coupled to storage controller 12 as explained above.

Network interface module (i.e. NIM) 27 provide an interface to the operator console via cable 29. Cables 31 and 33 couple input/output units 18 and 20 (see also FIG. 1) to storage controller 12. Input/output units 18 and 20 are physically packaged in an Input/output Complex Cabinet (i.e. ICC) which is not shown for clarity. Other referenced elements are as previously described.

Figure 3:
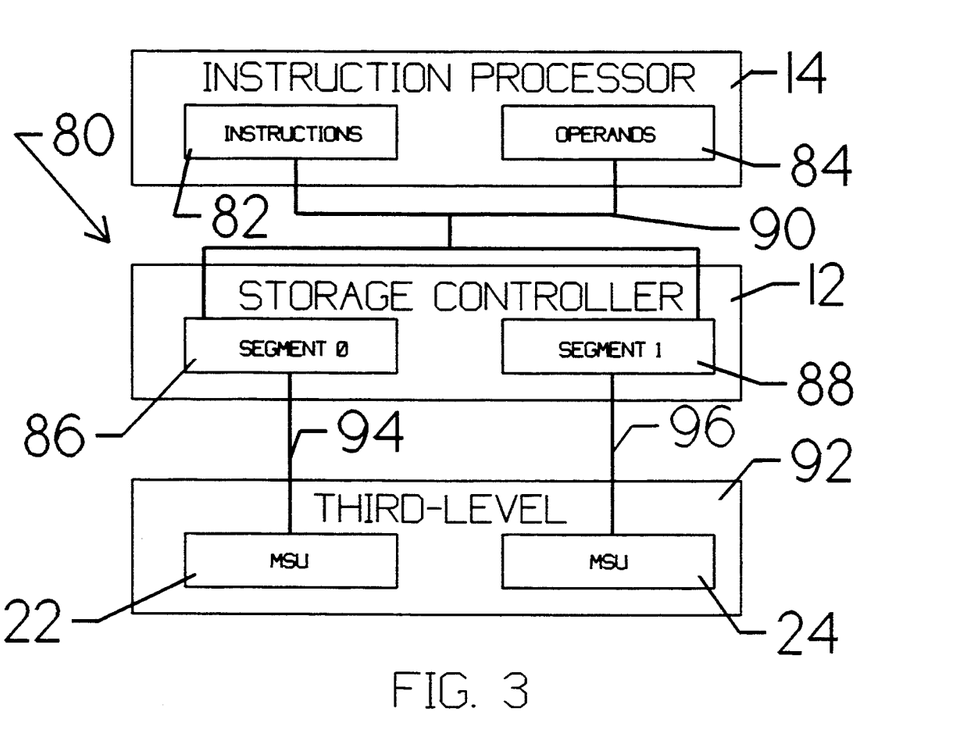
FIG. 3 is a schematic diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8 k of 36 bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36 bit words containing the desired data element. A more detailed explanation of the operation of instruction cache 82 and operand cache 84 is found below.

Storage controller 12 contains an intermediate level cache segment of 128 k 36 bit words for each for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also FIG. 1). Each data element request is divided between segment 0 cache 86 and segment 1 cache 88 based upon requested address. Only if the requested data element is not validly present in the appropriate intermediate level cache resource is an access request made to third level 92.

Figure 4:
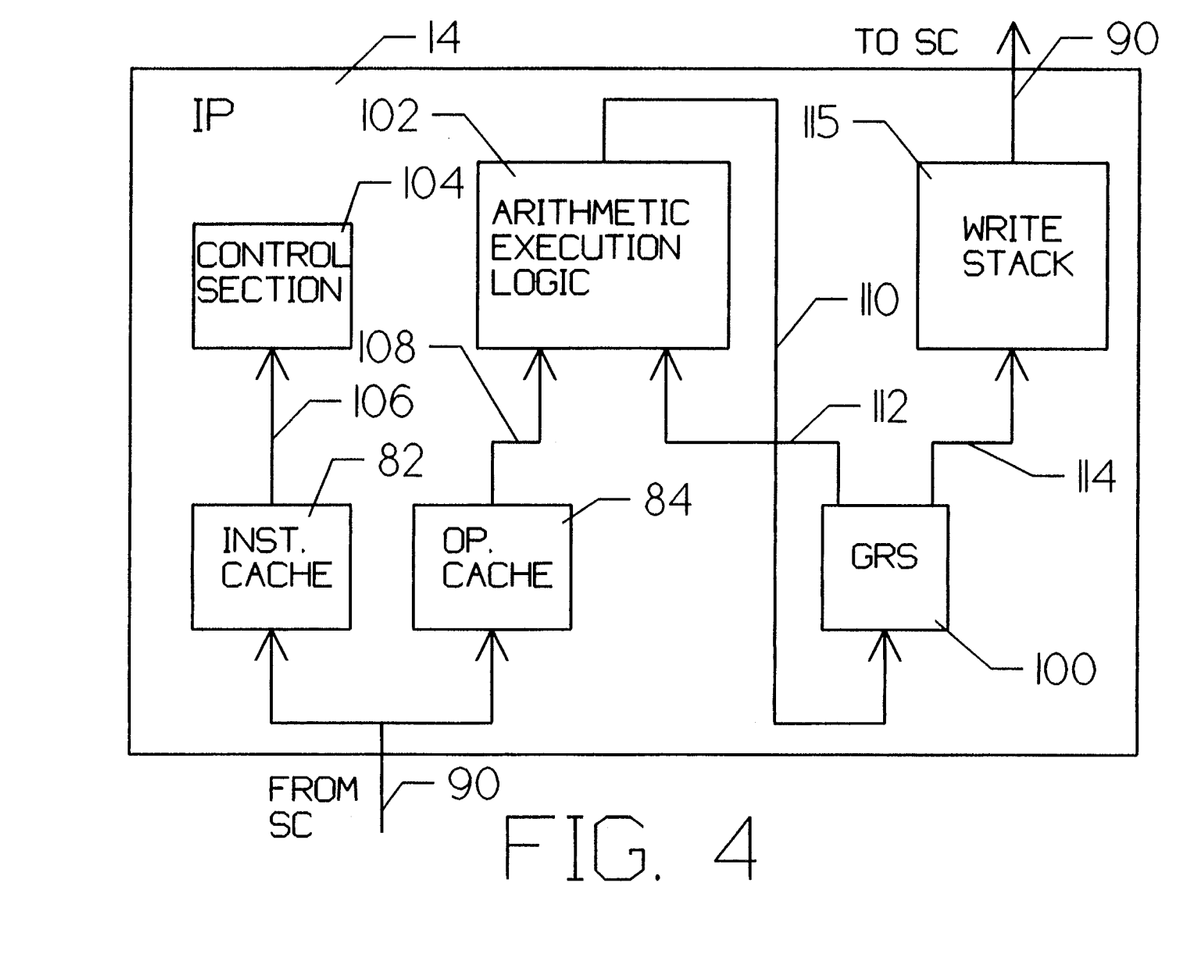
FIG. 4 is a simplified block diagram showing the major elements of the instruction processor.

FIG. 4 is a simplified block diagram of instruction processor 14 showing the major data and control paths. Cable 90, providing the data transfer path between storage controller 12 and instruction processor 14, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 14. Cable 90 also couples write data from write stack 115 to storage controller 12 for longer term storage. Priority for this shared interface is ordinarily given to read data requests requiring write data to be queued in write stack 115. The exception to giving priority to read data is whenever data is to be read from a location for which a write access has been queued.

Instructions from instruction cache 82 are provided via path 106 to control section 104 for decoding via microcode controller and hardwired control logic. Arithmetic execution logic 102 receives operand data via path 108 and performs the specified operation using a combination of microcode control and hardwired control as explained in greater detail below.

Most arithmetic instructions operate upon data which is temporarily stored in general register stack 100. This permits most rapid access to the data, because that data is directly accessed from an extremely fast storage stack. Similarly, arithmetic results are often returned to general register stack 100 for temporary storage until further arithmetic processing. Data is routed to general register stack 100 by path 110. Data from general register stack 100 is routed back to arithmetic execution logic 102 via path 112 and to write stack 115 via path 114. The data transferred to write stack 115 is queued for storage by storage controller 12 as discussed above.

Figure 5:
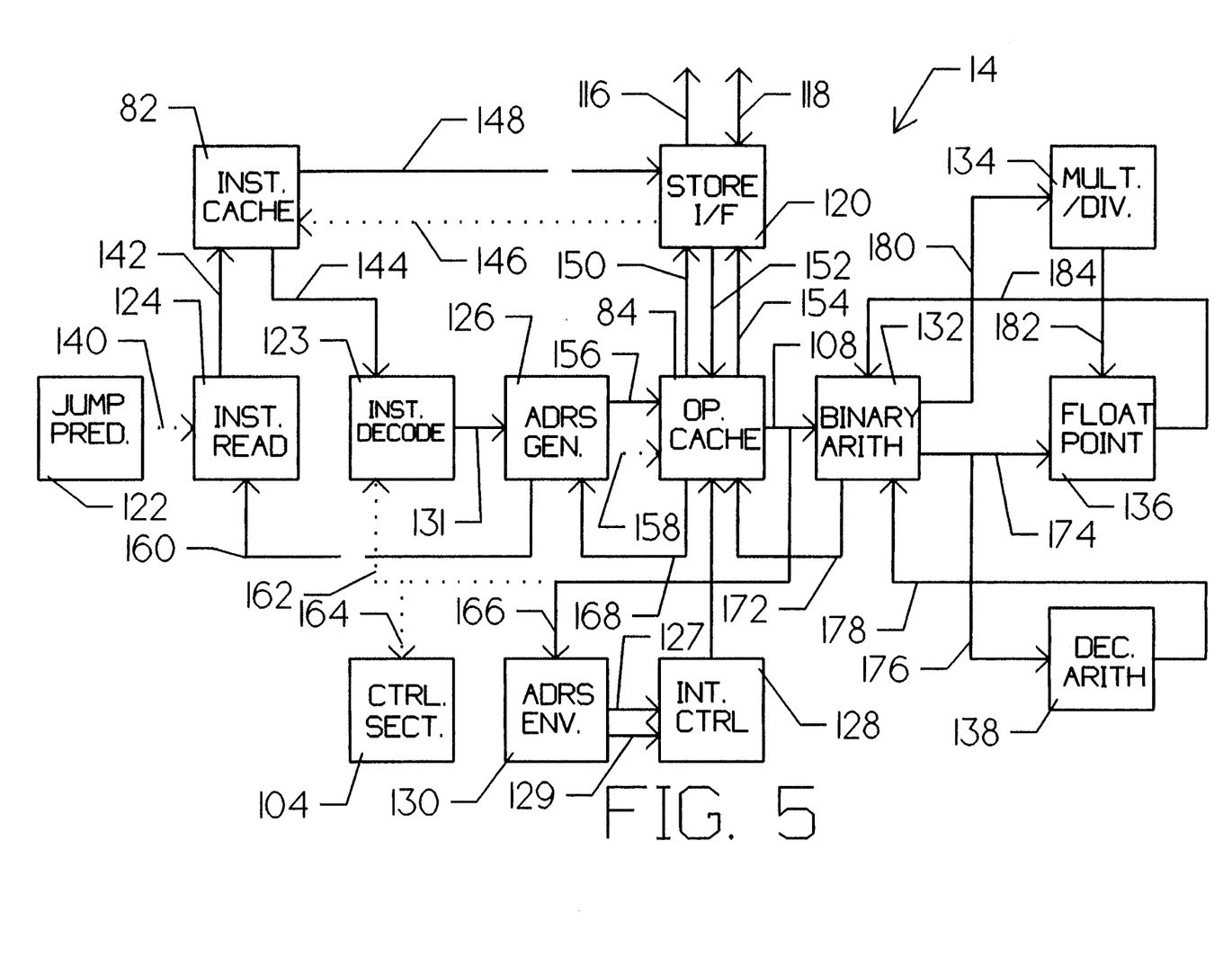
FIG. 5 is a detailed block diagram of the instruction processor.

FIG. 5 is a more detailed block diagram of instruction processor 14. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via cable 90, as described above. It consists of write cable 116 and read/write cable 118. Each of these data paths couples a 72 bit double word in parallel fashion. The function of write stack 115 (see also FIG. 4) is incorporated within store interface 120 which also provides the request/acknowledge synchronization logic. Addressing information for store interface 120 is sent from instruction cache 82 via cable 148 and operand cache 84 via cable 150 for a corresponding cache miss. Instructions are sent to instruction cache 82 via path 146. Because instructions are 36 bit words, path 146 has a width of 36 bits. Operand data read by storage controller 12 is transferred from store interface 120 to operand cache 84 by path 152. Similarly, write operand data is sent from operand cache 84 to store interface 120 via path 154. Both path 152 and path 154 have a width of 72 bits to accommodate double word operands.

Instructions to be executed are addressed by instruction read 124. The addresses are computed using one of the base registers located within address environment 130 as explained in more detail below. If the instruction is the next sequential instruction, its address is determined by incrementing the program address counter. If the instruction to be executed is addressed by a branch or jump instruction, the address is computed by address generator 126 and supplied via path 160. Alternatively, the address is supplied by jump prediction 122 via path 140 during operation in the jump prediction mode. The address of the next instruction is provided to instruction cache 82 via path 142.

The next addressed instruction is fetched from instruction cache 82 if a match is found. If the request results in a cache miss, storage controller 12 is requested to read the memory block containing the instruction as discussed above. In either case, the instruction is provided to instruction decoder 123 via path 144. The instruction is decoded through the use of a microcode controller by instruction decode 123, and the operand address is computed by address generator 126 from the data received via path 131.

Operand cache 84 contains general register stack 100 (see also FIG. 4). The cache is addressed by the output of address generator 126 received from path 158. Direct operands are received on path 156. If a match is not made in operand cache 84, a read request is made of storage controller 12 through store interface 120 as explained above. If a match is found in operand cache 84 or if the instruction specifies a direct operand received on path 156, the operand data is more immediately produced. In either case, the operand data is routed in accordance with the operation to be performed as specified by the instruction. Indirect operands cause the new operand address to be transferred to address generator 126 via path 168. Operands are transferred to binary arithmetic 132 for mathematical computation via path 108 or to address environment 130 via path 166.

Binary arithmetic 132 provides the basic control for all arithmetic operations to be performed on data received via path 108. Floating point operations are scaled and controlled by floating point logic 136 which receives operand data on path 174. Floating point results are returned to binary arithmetic 132 by path 184. Mult./div. 134 performs the basic multiplication and division operations for fixed point instructions. Operand data is received via path 180 and the products/quotients returned via path 182 and floating point logic 136. Decimal arithmetic 138 receives operand data on path 176 and returns results via path 178. Decimal arithmetic performs special purpose decimal operations.

Another category of instructions involves a change to the base registers within the addressing environment 130. The data is supplied to addressing environment 130 via path 166. Base register contents are supplied to interrupt control 128 via paths 127 and 129. Interrupt control 128 provides the interrupt data to operand cache 84 via path 170. Control section 104 provides the overall microcode control.

The operation of instruction processor 14 is intended to occur in the pipelined mode whenever feasible. The preferred mode utilizes a three stage pipeline. The timing of this pipelined operation may be found below and in the above referenced co-pending application which has been incorporated herein by reference. The remaining referenced components are as previously discussed.

Figure 6A:
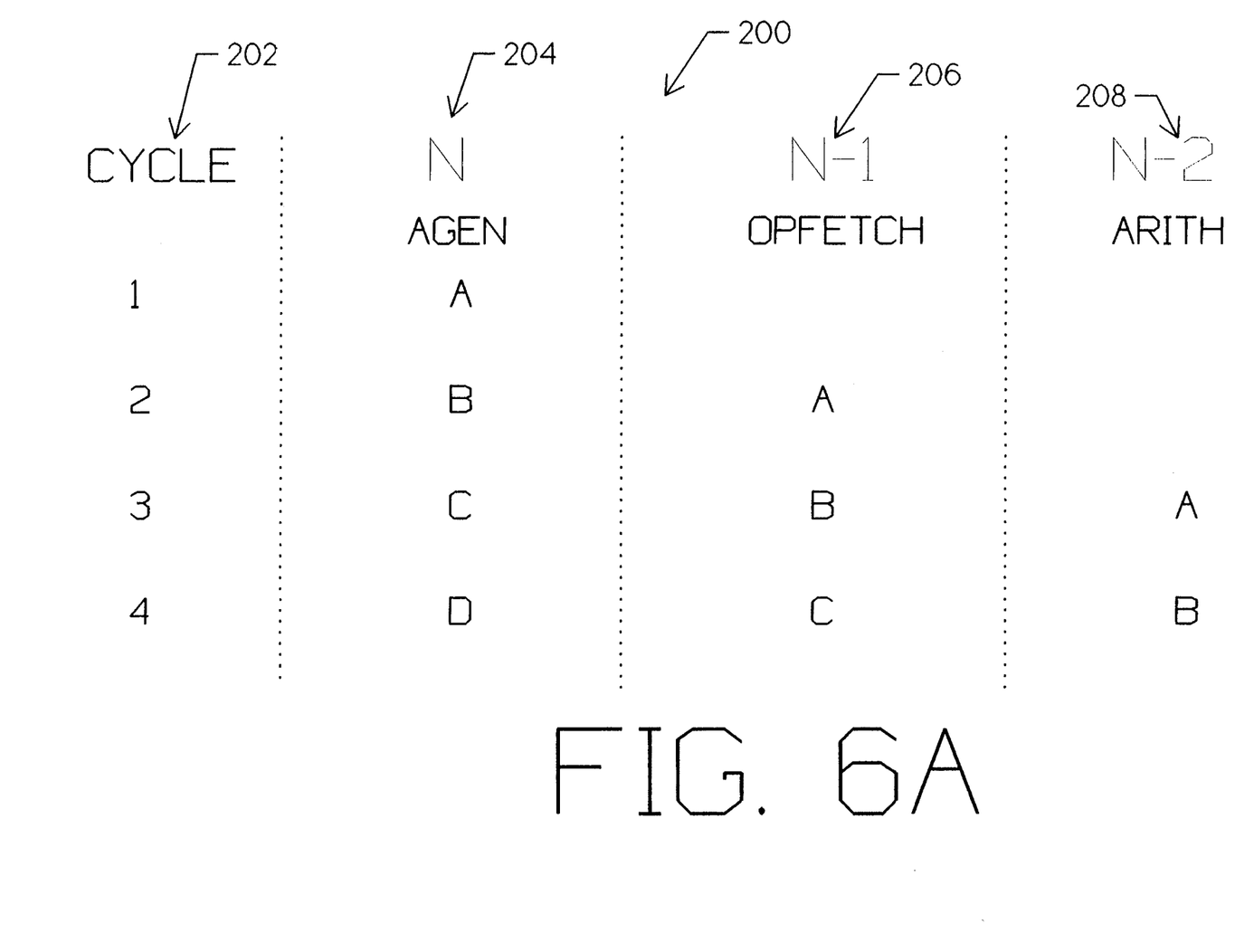
FIG. 6A schematically shows the operation of the three position pipeline.

FIG. 6A is a schematic diagram 200 showing the timing of the basic pipeline operation. Column 202 uniquely identifies the four clock cycles by number, which are used in the present example. Column 204 identifies by clock cycle, the individual instruction (designated A, B, C, and D) controlling the first stage of the pipeline (labeled AGEN), which generates the operand address and controls the microcode branching. Column 206 identifies by clock cycle, the individual instruction controlling the second stage of the pipeline (labeled OPFETCH). Similarly, column 208 identifies which instruction is in control of the third stage of the pipeline (i.e. ARITH).

For instruction A, the instruction decode and operand address generation functions are performed during clock cycle 1. The operand for instruction A is fetched at clock cycle 2. At clock cycle 3, the arithmetic functions of instruction A are performed and results are stored within the GRS as appropriate.

As can be seen in schematic diagram 200, a single instruction (e.g. instruction A) actually requires three clock cycles to complete. However, because each stage of the pipeline operates simultaneously, under ideal conditions, a different instruction completes arithmetic operations (see column 208) each clock cycle. This provides an effective instruction execution rate of one instruction per clock cycle.

To greatly simplify instruction development, the individual instructions (i.e. instructions A, B, C, and D) are each self sufficient. That is each instruction contains enough information to control each stage of the pipeline during the clock cycle in which that instruction is in control. This arrangement is called staged control in that control information note needed for a particular clock cycle is stored or "staged" for the next clock cycle. Staged control works particularly well when the instructions presented to the pipeline for execution are simple instructions requiring three clock cycles for completion. Because the software developer assumes completion of the Nth instruction before the N+1st, the situation does not arise wherein the N+1st instruction will cause a change to the execution of the Nth instruction.

However, the preferred architecture of the data processing system contains a number of software instructions which cannot be completed within three clock cycles. To prevent the performance impact of depiping, these extended length instructions are emulated by microcode control which are optimized to take advantage of the three stage pipeline. The microcode instructions thus defined are unlike the simple software instructions in that often times execution of the Nth microcode instruction may be impacted by branching of the N+1st microcode instruction.

In the present example, it maybe that instruction B contains a branch which may impact the validity of the arithmetic result of instruction A. This may occur when instruction B performs a limit check on data utilized by instruction A, for example. If the limit check indicates a security violation or other error, the arithmetic result produced by instruction A is invalid and should not be stored within the GRS. Again, the problem could be alleviated by depiping such that instruction A does not complete its arithmetic operations until the limit check of instruction B is accomplished. This solution would impose a performance penalty each time instruction A must be depiped unnecessarily.

A more satisfactory solution according to the present invention is to operate the pipeline in the normal fashion but provide the means to abort storage of the final arithmetic result of instruction A into the GRS. In this way the machine need not be depiped thus preserving the performance advantage of the pipeline. Whereas it is true that if the GRS store function is aborted, the instruction A arithmetic operation will have been for naught, the performance penalty paid is no greater than had depiping been used to resolve the problem. Furthermore, aborting of the GRS write tends to occur only for exceptional cases. However, the system according to the present invention will have gained one clock cycle over the depiping approach for each time the GRS store is not aborted, which corresponds to the normal situation.

In the preferred embodiment, a branch condition is the logical combination of two conditions. Therefore, whether or not a GRS write operation is aborted is based upon up to four different logical conditions.

Figure 6B:
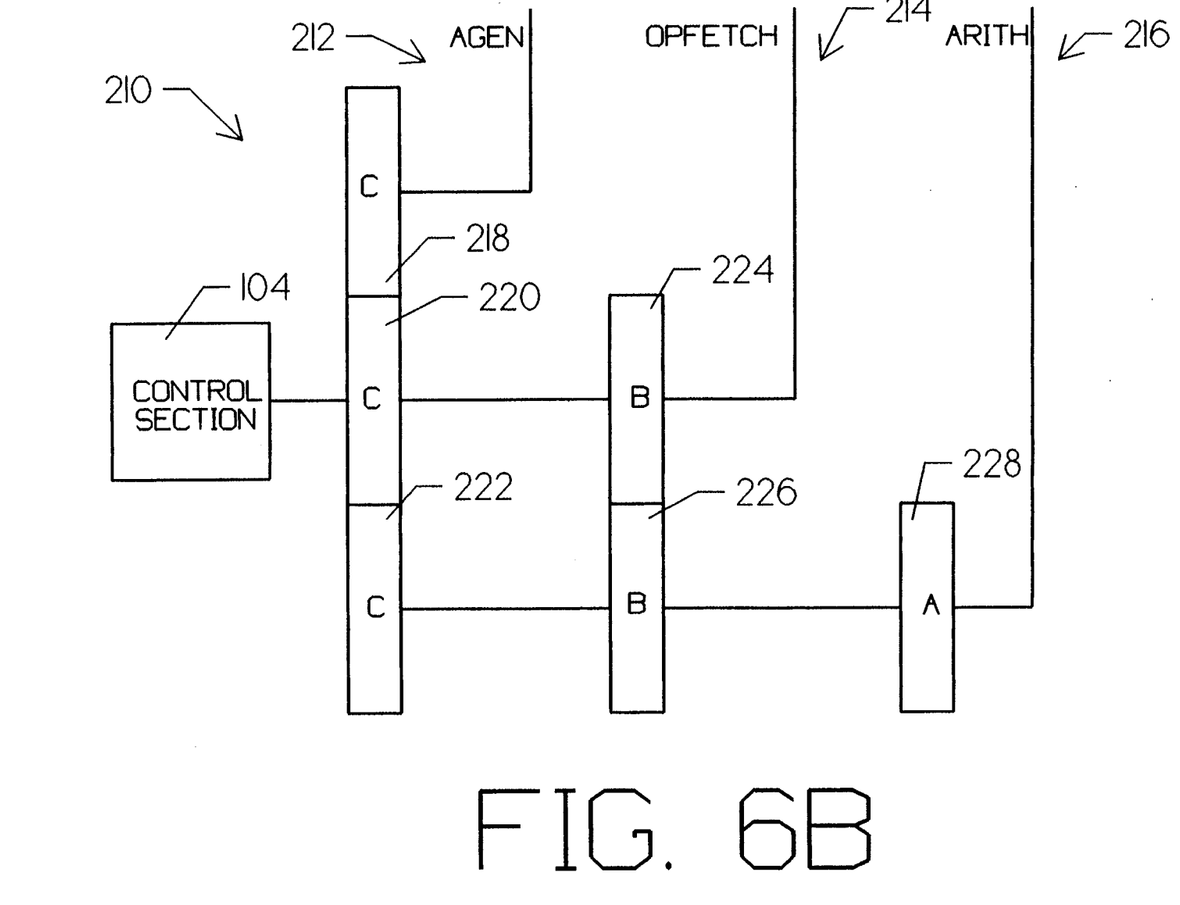
FIG. 6B shows the general control scheme for the three position pipeline.

FIG. 6B is a schematic diagram 210 showing the control staging for the three stage pipeline of the preferred embodiment. To relate this in time, it corresponds to clock cycle 3 of FIG. 6A. The microcode instructions are supplied by control section 104 (see also FIG. 5). Instruction C contains portion 218, which controls AGEN 212 (i.e. the first stage of the pipeline); portion 220, which controls OPFETCH 214 (i.e. the second stage of the pipeline); and portion 222, which controls ARITH 216 (i.e. the third stage of the pipeline). Note that during clock cycle 3, portion 218 is actually in control of AGEN 212. Portions 220 and 222, on the other hand, are staged or stored for use during later clock cycles.

During clock cycle 3, portion 224 of instruction B is in control of OPFETCH 214 and portion 226 is staged for control of ARITH 216 at a later clock cycle (i.e. probably the next clock cycle). That portion of instruction B which controls AGEN 212 has completed its function during clock cycle 2 and has therefore been discarded.

Portion 228 of instruction A is in control of ARITH 216 during clock cycle 3. The remaining two portions of instruction A have been discarded as their control functions were accomplished during previous clock cycles. At the completion of the arithmetic function specified by portion 228, the resultant may be stored in the GRS as appropriate. It is this GRS storage operation which may be aborted as a result of the microcode branch selection (at the AGEN stage of the pipeline) of instruction A or as a result of the microcode branch selection of instruction B.

Figure 7:
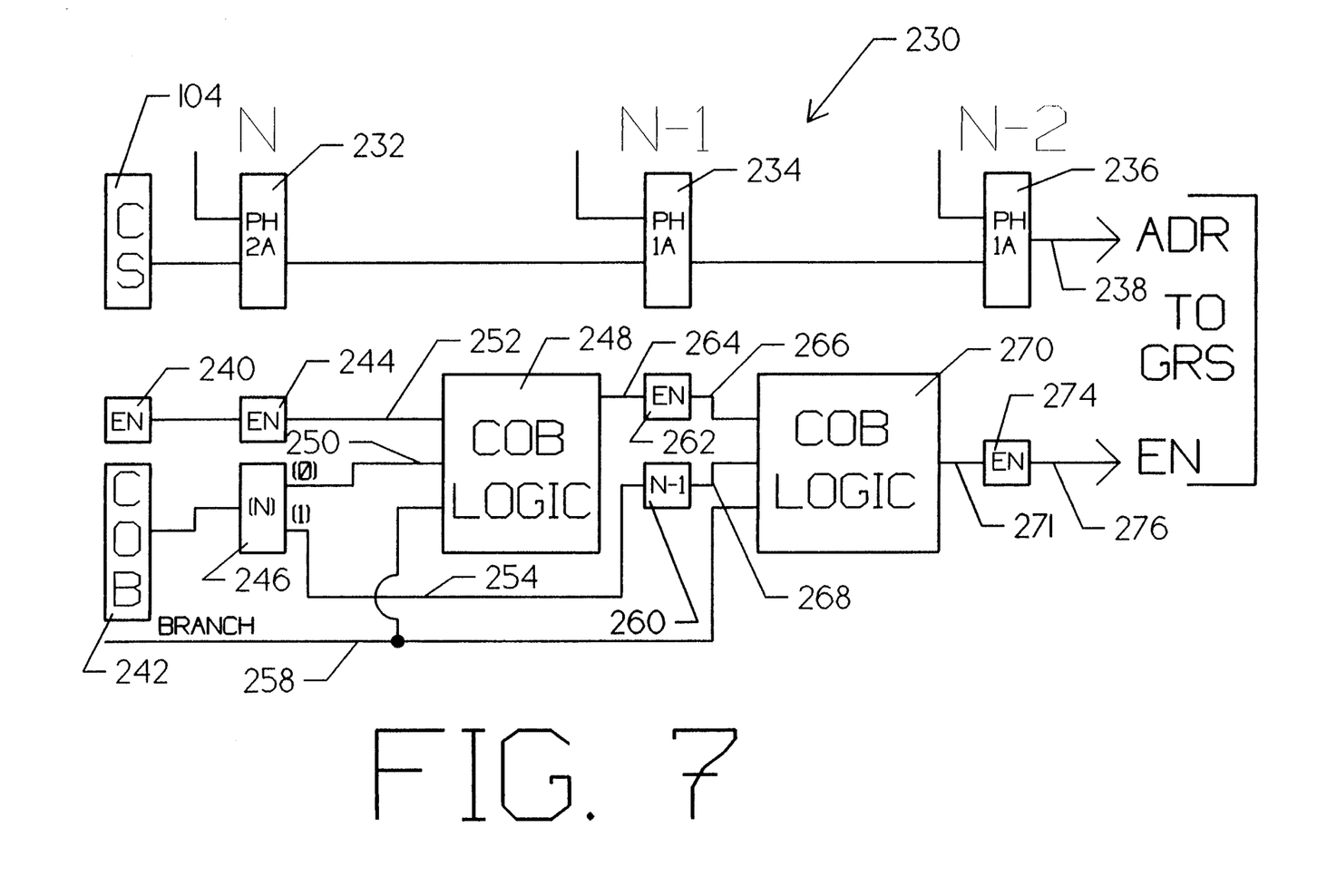
FIG. 7 shows the logic which produces the GRS write enable.

FIG. 7 is a block diagram of the hardware used to abort the GRS store of instruction A based upon a branch condition of instruction A or instruction B. The instructions are supplied by control section 104 for execution along the three stages of the pipeline as explained above. Logic 232 provides the AGEN function. Logic 234 performs the OPFETCH function. Logic 236 performs the ARITH function. One of the final products of the ARITH function is a GRS address provided on line 238 and data to be stored following the actual arithmetic operations (see also FIG. 4).

The remaining logic of FIG. 7 is associated with enabling/disabling of the prospective GRS write operation of instruction A based upon the presence or absence of an abort signal generated as a result of a branch by the present or a succeeding instruction (i.e. instruction A or instruction B). The control section branch signal for the succeeding instructions is detected within the control section and transferred via line 258 to both cancel on branch logic 248 and cancel on branch logic 270.

The cancel logic 242 provides a signal to staging latch 246 which indicates whether the instruction (i.e. instruction A) currently at stage 3 of the pipeline is sensitive to branches of itself or the succeeding instruction. These signals are actually bit positions within each microcode instruction, which specify whether the GRS write operation of that microcode instruction may need to be aborted based upon a branch of itself and/or a branch of the next instruction. For convenience, these bit positions may be termed abort 1 and abort 2, respectively.

The states of the abort 1 and abort 2 bits for instruction A are supplied to cancel on branch logic 248 via line 250. Line 254 transfers the result of the determination to N−1 staging latch 260 and from there to cancel on branch logic 270 via line 268. The result of the cancel on branch logic 248 determination is transferred to cancel on branch logic 270 via lines 264 and 266 as enabled by timing enable 262. Timing enables 240, 244, 262, and 274 merely synchronize their input signal to the corresponding clock cycle. The enable to perform the GRS store operation is supplied via line 276 assuming that the operation has not been aborted by the branching of itself or a subsequent instruction.

Figure 8:
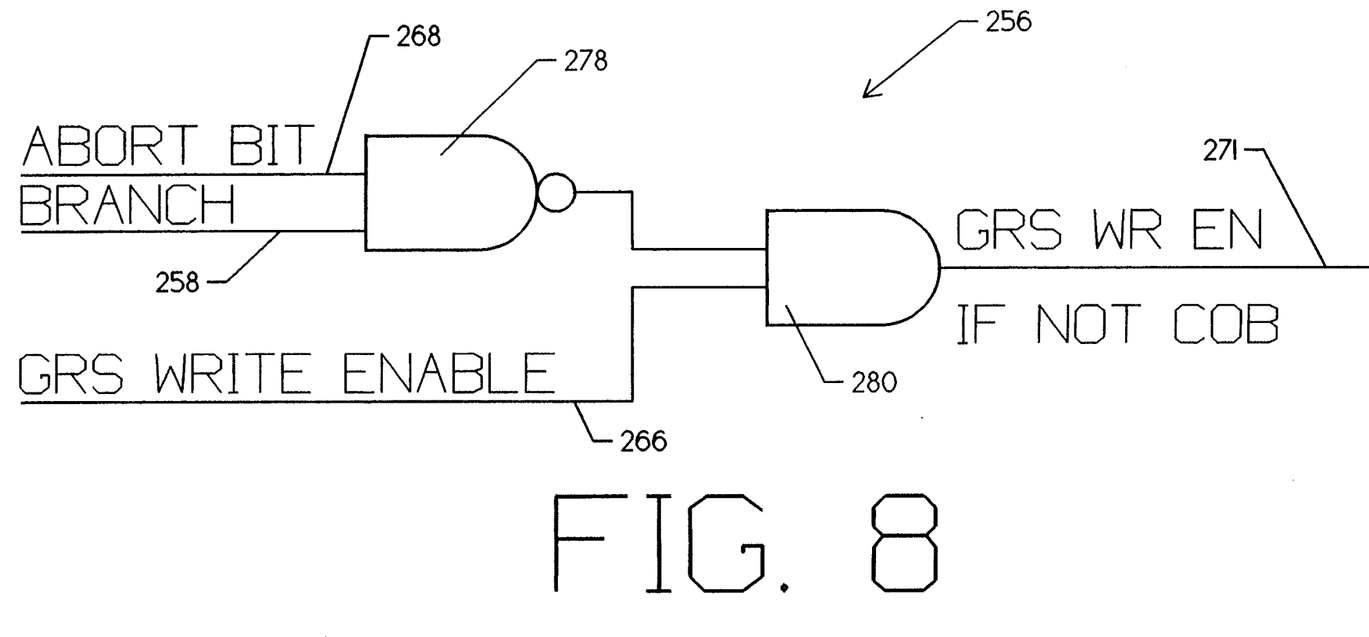
FIG. 8 shows the logic for the cancel on branch logic.

FIG. 8 is a schematic diagram 256 showing the circuitry of the cancel on branch logic 270 for stage three of the pipeline. As can be seen from referring back to FIG. 7, separate cancel on branch logic is required for pipeline stage two as well.

To produce a GRS write enable signal for instruction A from instruction B via line 271, a GRS write enable signal must be received via line 266 (i.e. GRS write not aborted by stage two) and gate 280 must receive a logic high output from gate 278. Gate 278 produces a logic high output if line 268 is a logical low or line 258 is a logical low. Line 268 is low if abort 2 is not set. That means that the GRS write operation of instruction A can be enabled even if instruction B contains a branch, because the arithmetic operation of instruction A is independent of a branch in instruction B. Line 258 is low if instruction B does not contain a branch. Therefore, if abort 2 is set and instruction B branches, no GRS write enable is produced and the arithmetic result of instruction A is aborted.

As stated above, the circuit of FIG. 8 serves to abort the GRS write operation of instruction A based upon a branch condition of instruction B. The GRS write operation can also be aborted by a branch condition of instruction A itself (see cancel on branch logic 248 of FIG. 7). This is accomplished by a similar circuit which is not shown for clarity. The GRS write operation of instruction A can thus be aborted if abort 1 of instruction A is set and instruction A branches.

Figure 9:
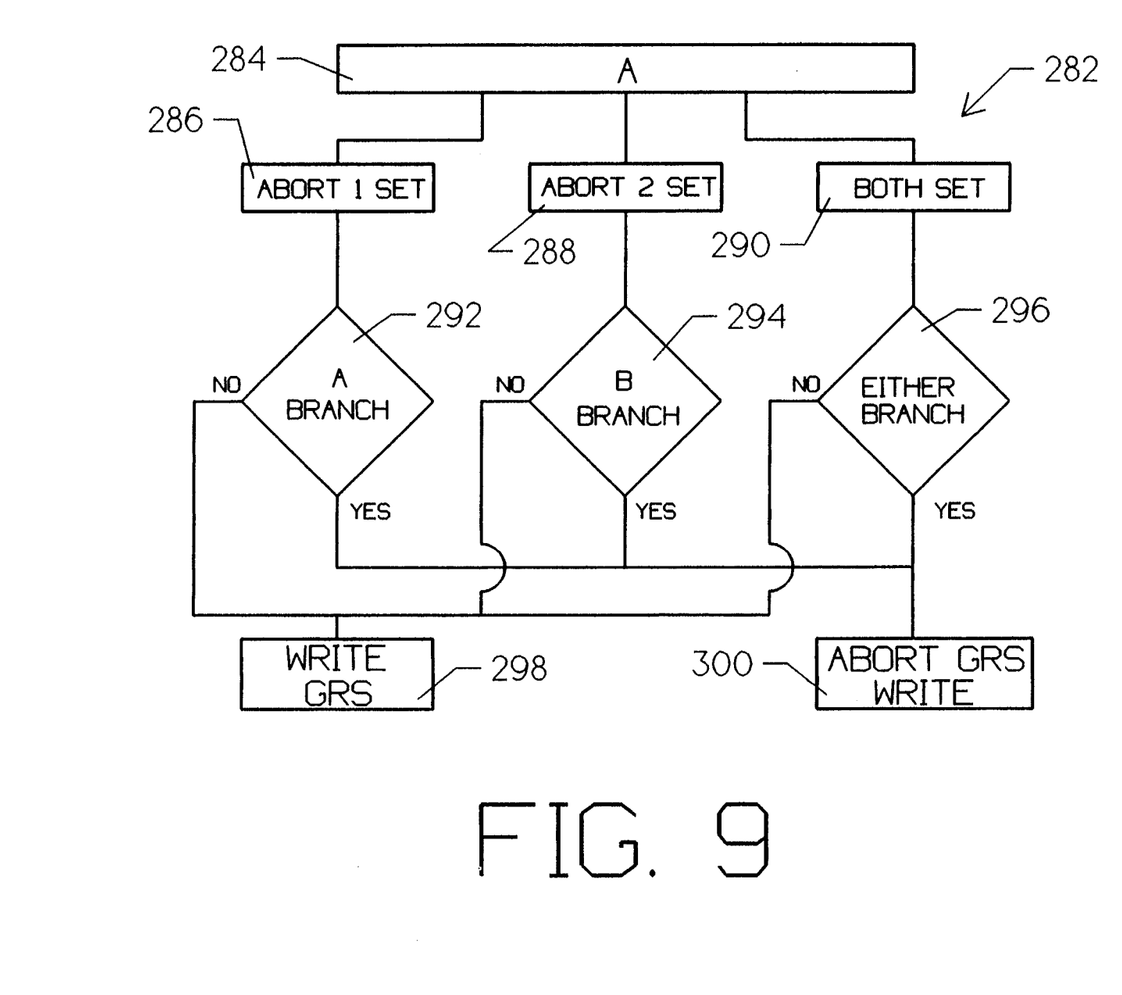
FIG. 9 shows the logical decision tree for GRS abort on branch.

FIG. 9 is a schematic diagram 282 showing the logical conditions for aborting the GRS write operation of the Ath instruction 284. Element 286 shows the state of abort 1, element 288 shows the state of abort 2, and element 290 indicates if both abort 1 and abort 2 are set.

If abort 1 of instruction A is set and instruction A branches, element 292 cause element 300 to abort the GRS write of instruction A. Similarly, if abort 2 of instruction A is set and instruction B branches, element 294 causes element 300 to abort the GRS write of instruction A. Element 296 similarly causes the GRS write of instruction A to be aborted if both abort 1 and abort 2 are set and either instruction A or instruction B branches.

Element 298 is permitted to enable a GRS write operation for instruction A if and only if none of these conditions are met. By permitting the arithmetic operation to continuing and the results to be conditionally aborted, the pipeline operation is continued to the maximum extent possible without depiping for potential branch conditions.

Having thus described the preferred embodiments of the present invention, those of skill in the art will readily appreciate that the teachings found herein may be applied to yet other embodiments within the scope of the claims hereto attached.

We claim:

1. In a pipelined data processing system having an instruction processor for executing a series of instructions and having means for controlling said executing of said series of instructions such that said instruction processor can simultaneously execute a second portion of a first instruction of said series of instructions and a first portion of a second instruction of said series of instructions, wherein the first instruction precedes the second instruction in the series of instructions, the improvement comprising:

- a. detecting means coupled to said controlling means for detecting when the execution of said second portion of said first instruction of said series of instructions is conditioned on a result of the execution of said first portion of said second instruction or said series of instructions; and
- b. aborting means coupled to said controlling means and to said detecting means for aborting said second portion of said first instruction if said detecting means determines that said second portion of said first instruction of said series of instructions is conditioned on the result of the execution of said first portion of said second instruction of said series of instructions and the results of the execution of said first portion of said second instruction of said series of instructions indicates that the condition is met; and wherein said first portion of said second instruction is a branch instruction and said second portion of said first instruction is a data store instruction.

2. An improvement according to claim 1 wherein said instruction processor has a general register stack for storing said results.

3. An improvement according to claim 2 wherein said storing said results is storing within said general register stack.

4. An improvement according to claim 3 further comprising a second portion of said second instruction and a third portion of said first instruction.

5. An improvement according to claim 4 further comprising means to abort said second portion of said second instruction based upon said third portion of said first instruction.

6. A pipelined data processing system having an instruction processor for executing a series of instructions and having a control circuit for controlling said executing of said series of instructions such that said instruction processor can simultaneously execute a second portion of a first instruction of said series of instructions and a first portion of a second instruction of said series of instructions, wherein the first instruction precedes the second instruction in the series of instructions, comprising:

- a. a detecting circuit coupled to said controlling circuit for detecting when the execution of said second portion of said first instruction of said series of instructions is conditioned on a result of the execution of said first portion of said second instruction of said series of instructions; and
- b. an aborting circuit coupled to said controlling circuit and to said detecting circuit for aborting said second portion of said first instruction if said detecting circuit determines that said second portion of said first instruction of said series of instructions is conditioned on the result of the execution of said first portion of said second instruction of said series of instructions and the results of the execution of said first portion of said second instruction of said series of instructions indicates that the condition is met; and wherein said first portion of said second instruction is a branch instruction and said second portion of said first instruction is a data store instruction.

7. A pipelined data processing system having an instruction processor for executing a series of instructions comprising:

- a. a control circuit for controlling said executing of said series of instructions such that said instruction processor can simultaneously execute a second portion of a first instruction of said series of instructions and a first portion of a second instruction of said series of instructions, wherein the first instruction precedes the second instruction in the series of instructions;
- b. a detecting circuit coupled to said controlling circuit for detecting when the execution of said second portion of said first instruction of said series of instructions is conditioned on a result of the execution of said first portion of said second instruction of said series of instructions;
- c. a general register stack located in said instruction processor for storing said results; and
- d. an aborting circuit coupled to said controlling circuit and to said detecting circuit for aborting said second portion of said first instruction if said detecting circuit determines that said second portion of said first instruction of said series of instructions is conditioned on the result of the execution of said first portion of said second instruction of said series of instructions and the results of the execution of said first portion of said second instruction of said series of instructions indicates that the condition is met; and wherein said first portion of said second instruction is a branch instruction and said second portion of said first instruction is a data store instruction.

* * * * *